United States Patent

Dzioba

[11] Patent Number: 5,139,281
[45] Date of Patent: Aug. 18, 1992

[54] AUTOMOTIVE STEERING COLUMN

[75] Inventor: Donald L. Dzioba, Midland, Mich.

[73] Assignee: General Motors Corporation, Detroit, Mich.

[21] Appl. No.: 667,783

[22] Filed: Mar. 11, 1991

[51] Int. Cl.$^5$ ............................................. B62D 1/18
[52] U.S. Cl. ................................ 280/775; 439/23; 74/492; 280/731
[58] Field of Search ............... 280/731, 775; 439/15, 439/23, 24, 25, 26; 74/492, 493; 200/61.54

[56] References Cited

U.S. PATENT DOCUMENTS

| | | | |
|---|---|---|---|
| 3,470,521 | 9/1969 | Downey | 439/23 |
| 3,747,426 | 7/1973 | Schluckebier | 74/492 |
| 4,218,073 | 8/1980 | Cymbal | 280/731 |
| 4,223,911 | 9/1980 | Cymbal et al. | 280/731 |
| 4,383,148 | 5/1983 | Arima et al. | 200/61.54 |
| 4,850,239 | 7/1989 | Oosterwal | 74/493 |
| 4,850,881 | 7/1989 | Lagier et al. | 439/22 |
| 4,868,355 | 9/1989 | Inui et al. | 200/61.54 |

Primary Examiner—Charles A. Marmor
Assistant Examiner—Karin Tyson
Attorney, Agent, or Firm—Saul Schwartz

[57] ABSTRACT

An automotive steering column having slip rings rotatable with a steering shaft and contact brushes on a housing of the steering column for transferring electrical signals between the steering column and a steering wheel rotatable with the steering shaft. The steering shaft is supported on the housing by a pair of longitudinally spaced bearings including an outboard bearing having an inner race on an adapter sleeve rotatable as a unit with the steering shaft. The slip ring is on the adapter sleeve between the spaced bearings and the adapter sleeve defines an annular spacer between the inner race of the outboard bearing and the steering shaft. A passage is defined in the portion of the adapter sleeve defining the annular spacer and a conductor connected to the slip ring traverses the plane of the outboard bearing in the passage.

4 Claims, 1 Drawing Sheet

AUTOMOTIVE STEERING COLUMN

FIELD OF THE INVENTION

This invention relates to automotive steering columns having provision for electronic signal transfer between stationary and rotatable elements of the steering columns.

BACKGROUND OF THE INVENTION

Slip rings and brushes are commonly used in automobile steering columns to transfer electronic signals between controls on a rotatable steering wheel and stationary conductors on the column. Multiple slip rings and brushes required for multiple controls on the steering wheel and for electronics associated with inflatable restraints contribute to the size of the steering column and to the overhang of the steering wheel relative to an upper steering column attachment to a vehicle body. A steering column according to this invention has a steering shaft mounting arrangement which contributes to minimization of column size and steering wheel overhang while maintaining acceptable slip ring type electronic signal transfer capability.

SUMMARY OF THE INVENTION

This invention is a new and improved automotive steering column including a steering shaft, a steering wheel on the steering shaft and a pair of bearings spaced longitudinally along the steering shaft for rotatably mounting the latter on a supporting part of the steering column. A plurality of electrical contact brushes are disposed on the supporting part of the steering column between the bearings and engage slip rings on an adapter sleeve mounted on and rotatable as a unit with the steering shaft. The outboard steering shaft bearing, i.e. the one of the bearings nearest to the steering wheel, has an inner race mounted directly on the adapter sleeve so that the sleeve defines an annular spacer between the steering shaft and the inner race. A plurality of electrical conductors have inboard ends connected to respective ones of the slip rings and outboard ends connected to the controls and the like on the steering wheel. The conductors traverse the plane of the outboard bearing in the annular clearance defined by the adapter sleeve. In a preferred embodiment, the supporting part of the steering column is a tilt housing of a tilt-adjustable steering column.

DESCRIPTION OF A PREFERRED EMBODIMENT

Figure 1:
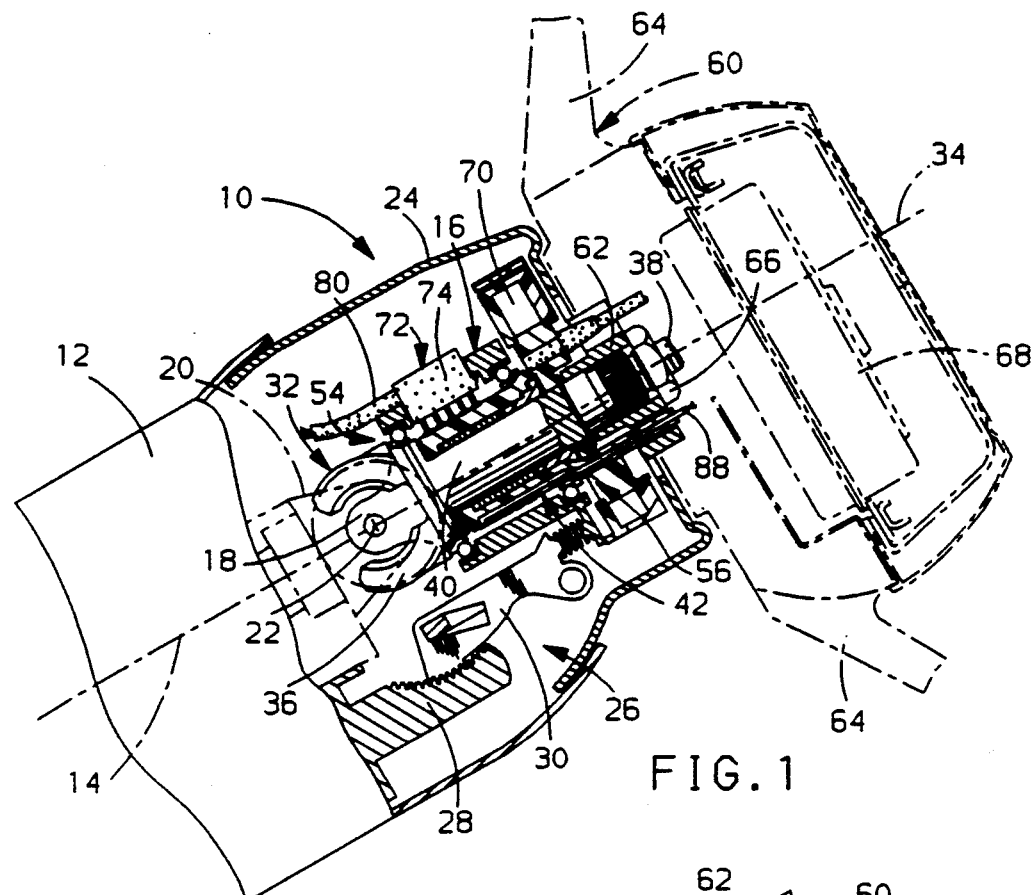
FIG. 1 is a fragmentary, partially broken-away side elevational view of an automotive steering column according to this invention.
Figure 2:
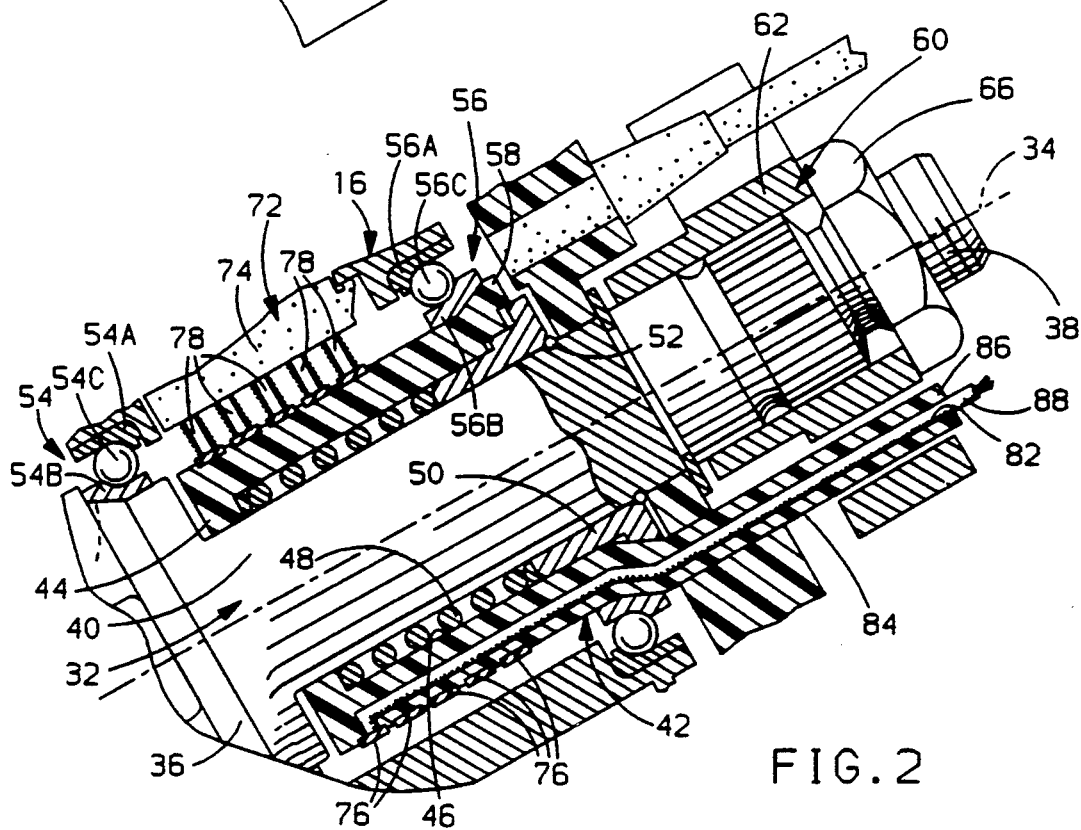
FIG. 2 is an enlarged view of a portion of FIG. 1.

Referring to the drawings, a tilt-adjustable automotive steering column (10) according to this invention includes a fragmentarily illustrated tubular mast jacket (12) adapted for rigid attachment to a vehicle body, not shown, in usual fore-and-aft orientation. A lower steering shaft, not shown, is supported in the mast jacket (12) in conventional fashion for rotation about a longitudinal centerline (14) of the steering column. The lower end of the lower steering shaft is connected to a steering gear of the vehicle.

A fragmentarily illustrated tubular tilt housing (16) of the steering column (10) has a pair of diametrically opposite trunnions, only a single trunnion (18) being illustrated in FIG. 1. The trunnions on the tilt housing (16) are aligned with and overlap a similar pair of trunnions on the upper end of the mast jacket (12), only a single trunnion (20) on the mast jacket being illustrated in FIG. 1. Respective ones of a pair of pivot pins are aligned on a transverse axis (22) of the steering column (10) and are received in registered holes in the overlapped trunnions whereby the tilt housing is supported on the mast jacket for up and down pivotal movement about the transverse axis (22). A decorative cover or escutcheon (24) is connected to the tilt housing and moves with the latter relative to the mast jacket.

A tilt-lock (26) of the steering column includes an arcuate rack (28) on the mast jacket (12) and a toothed lever (30) pivotally supported on the tilt housing (16). The toothed lever and rack, when engaged, capture the angular position of the tilt housing relative to the mast jacket and, when released or disengaged, permit up and down pivotal movement of the tilt housing about the transverse axis (22).

An upper steering shaft (32) of the steering column (10) is aligned on a longitudinal centerline (34) of the tilt housing (16) which coincides with the centerline (14) of the steering column in one position of the tilt housing relative to the mast jacket (12), FIG. 1. The upper steering shaft has a forked inboard end (36), a serrated and threaded outboard end (38), and a cylindrical shank (40) between the inboard and outboard ends. The forked end (36) is one element of a universal joint between the upper steering shaft (32) and the lower steering shaft, not shown, which connects the steering shafts for unitary rotation and which accommodates relative pivotal movement between the steering shafts about the transverse axis (22). A representative steering shaft universal joint is described in U.S. Pat. No. 3,747,426, issued 24 Jul. 1973 and assigned to the assignee of this invention.

A tubular adapter sleeve (42) is received around the shank (40) of the upper steering shaft (32). The sleeve has an in-turned flange (44) at one end and an inner wall (46) which faces and is radially spaced from the shank of the steering shaft by the radial depth of the flange (44). A spring (48) is disposed around the shank (40) of the upper steering shaft between the latter and the inner wall (46) of the sleeve. The spring seats at one end against the in-turned flange (44) and at the other end against an abutment by an annular collar (50) on the upper steering shaft. The collar (50) is retained on the upper steering shaft by a ring (52) in a groove in the steering shaft. The inner wall (46) of the sleeve (42) is journaled on the collar (50) so that the collar cooperates with the flange (44) on the sleeve in supporting the sleeve (42) on the upper steering shaft for limited fore-and-aft sliding movement in the direction of centerline (34). In addition, the sleeve (42) and the collar (50) are rotatable as a unit with the upper steering shaft.

The inboard or forked end (36) of the upper steering shaft (32) is supported on the tilt housing (16) for rotation about the centerline (34) by a first or inboard bearing (54). The bearing (54) includes an outer race (54A) in a counter bore at an inboard end of the tubular tilt housing, an inner race (54B) on the upper steering shaft, and a plurality of bearing elements (54C) between the inner and outer races.

The outboard or steering wheel end (38) of the upper steering shaft (32) is supported on the tilt housing for rotation about the centerline (34) by a second or outboard bearing (56). The second bearing (56) includes an outer race (56A) in a counter bore at an outboard end of the tubular tilt housing, an inner race (56B) on the adapter sleeve (42), and a plurality of bearing elements (56C) between the inner and outer races. Dislodgement of the inner race (56B) from the sleeve (42) is prevented by a flared end (58) of the sleeve. The spring (48) preloads the inner races (54B)(56B) toward each other to eliminate longitudinal lash between the upper steering shaft (32) and the tilt housing (16).

A fragmentarily illustrated steering wheel (60) is disposed on the outboard end of the upper steering shaft and includes a hub (62) and a plurality of radial spokes (64). The hub (62) is press fitted on the outboard end (38) of the upper steering shaft and is retained on the latter by a nut (66). An inflatable restraint element (68), FIG. 1, may be folded in the center of the steering wheel (60). In addition, electrical switches or the like, not shown, may also be mounted on the steering wheel for rotation as a unit with the steering wheel and the upper steering shaft. An inflatable restraint coil (70) is likewise disposed on the steering shaft (32) behind the steering wheel (60) and rotatable as a unit therewith.

The steering column (10) further includes a brush and slip ring arrangement (72) for transferring electronic signals between conductors on the tilt housing and switches or other controls on the steering wheel. The brush and slip ring arrangement includes a brush holder (74) on the tilt housing (16) and a plurality of slip rings (76) on the adapter sleeve (42) between the bearings (54)(56). The brush holder supports a plurality of contact brushes (78) each of which bears against a corresponding one of the slip rings (76). Each contact brush is connected to one of a plurality of conductors bundled in a stationary wiring harness (80) of the steering column, FIG. 1.

Each of the slip rings (76) is electrically insulated from the other slip rings and is connected to an individual control or switch or the like on the steering wheel (60) by a conductor mounted on the adapter sleeve (42). With respect to these conductors, the adapter sleeve (42) functions as an annular spacer between the inner race (56B) of the outboard bearing (56) and the shank (40) of the upper steering shaft (32) providing an annular clearance radially inboard of the inner race for passage of the conductors. For example, a passage (82) may be formed in the sleeve (42) extending from one of the slip rings (76), through a stem (84) integral with the sleeve, to an end (86) on the steering wheel side of the bearing (56). A conductor (88) in the passage (82) has one end electrically connected to the slip ring (76) and the other end electrically connected to a switch or the like on the steering wheel. The passage (82) is representative of any clearance, e.g. a notch in the surface of the sleeve (42), which allows the conductor (88) to transit the plane of the outboard bearing in the annular clearance between the bearing inner race and the upper steering shaft afforded by the sleeve (42).

I claim:

1. An automotive steering column comprising:
a housing,
a steering shaft aligned on a longitudinal centerline of said housing and including an outboard end adapted for attachment of a steering wheel,
a first bearing between said housing and said steering shaft including a first inner race means on said steering shaft,
a second bearing including an outer race means on said housing and a second inner race means around said steering shaft between said first inner race means and said outboard end of said steering shaft,
a tubular adapter sleeve disposed on said steering shaft for rotation as a unit therewith and defining an annular spacer between said second inner race means and said steering shaft whereby said first and said second bearings cooperate in supporting said steering shaft on said housing for rotation about said longitudinal centerline,
means defining a slip ring on said tubular adapter sleeve between said first and said second bearings,
means on said tubular adapter sleeve defining a passage through said annular spacer defined by said tubular adapter sleeve between said steering shaft and said second inner race means,
an electrical conductor connected to said slip ring and traversing said second bearing through said passage, and
a brush contact on said housing slidably engaging said slip ring.

2. The steering column recited in claim 1 wherein said housing is a tilt housing of a tilt-adjustable steering column pivotable relative to a stationary mast jacket of said steering column.

3. An automotive steering column comprising:
a stationary mast jacket,
a tilt housing supported on said mast jacket for pivotal movement about a transverse axis of said steering column,
an upper steering shaft aligned on a longitudinal centerline of said tilt housing and including a cylindrical shank and an outboard end adapted for attachment of a steering wheel,
a first bearing including an outer race on said tilt housing and an inner race on said upper steering shaft,
a second bearing including an outer race on said tilt housing and an inner race around said shank of said upper steering shaft between said outboard end thereof and said first bearing inner race,
a tubular adapter sleeve on said shank of said steering shaft rotatable as a unit with said steering shaft and having a flared end,
said tubular adapter sleeve being disposed in said second bearing inner race with said flared end thereof between said second bearing inner race said outboard end of said steering shaft and defining an annular spacer between said second bearing inner race and said shank of said steering shaft,
a spring disposed between said upper steering shaft and said tubular adapter sleeve biasing said adapter sleeve and said upper steering shaft in opposite longitudinal directions thereby to eliminate longitudinal lash between said steering shaft and said tilt housing,
means defining a slip ring on said tubular adapter sleeve between said first and said second bearings,
means on said tubular adapter sleeve defining a passage through said annular spacer defined by said tubular adapter sleeve between said upper steering shaft and said second bearing inner race,
an electrical conductor connected to said slip ring and traversing said second bearing through said passage, and
a brush contact on said tilt housing slidably engaging said slip ring.

4. The steering column recited in claim 3 wherein said spring is disposed in an annular clearance between said tubular adapter sleeve and said shank of said upper steering shaft and bears at one end against an in-turned flange on said tubular adapter sleeve and at the other end against an abutment on said upper steering shaft.

* * * * *